(12) United States Patent
Mufti et al.

(10) Patent No.: US 10,349,262 B2
(45) Date of Patent: *Jul. 9, 2019

(54) REALM TRANSLATION IN AN IMS NETWORK

(71) Applicant: T-Mobile USA, Inc., Bellevue, WA (US)

(72) Inventors: Shujaur Mufti, Snoqualmie, WA (US); Zeeshan Jahangir, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/707,795

(22) Filed: Sep. 18, 2017

(65) Prior Publication Data
US 2018/0007533 A1    Jan. 4, 2018

Related U.S. Application Data

(63) Continuation of application No. 14/697,935, filed on Apr. 28, 2015, now Pat. No. 9,769,646.
(Continued)

(51) Int. Cl.
*H04W 8/02* (2009.01)
*H04L 29/06* (2006.01)
(Continued)

(52) U.S. Cl.
CPC ......... *H04W 8/02* (2013.01); *H04L 29/06197* (2013.01); *H04L 65/1006* (2013.01);
(Continued)

(58) Field of Classification Search
CPC ............... H04L 29/06197; H04L 69/22; H04L 65/1006; H04L 65/1016; H04L 65/1036; H04L 65/1073; H04W 60/04; H04W 8/02
See application file for complete search history.

(56) References Cited

U.S. PATENT DOCUMENTS 8,374,605 B2    2/2013    Kuhn et al.
8,468,267 B2    6/2013    Yang et al.
(Continued)

FOREIGN PATENT DOCUMENTS

| EP | 1849270 A1 | 10/2007 |
| EP | 1944945 A1 | 7/2008 |
| WO | 2016138222 | 9/2016 |

OTHER PUBLICATIONS

International Searching Authority, International Search Report and Written Opinion, PCT Patent Application PCT/US2016/019660, dated Jul. 1, 2016, 16 pages.
(Continued)

*Primary Examiner* — Chi H Pham
*Assistant Examiner* — Weibin Huang
(74) *Attorney, Agent, or Firm* — Perkins Coie LLP

(57) ABSTRACT

Various embodiments of the present technology allow multi-realm support at I/S-CSCF to IMS by the same I/S-CSCF nodes. Some embodiments allow for a registration message to be received from an IMS client. The registration message can be used to establish, through an Internet Protocol Multimedia Subsystem (IMS) core network, a service between a first endpoint associated with a first realm and a second endpoint associated with a second, different realm. The registration message can be translated so that the second endpoint believes the first endpoint is associated with the second realm before being transmitted to the second endpoint. Upon receiving a successful IMS registration message from the IMS core network, a binding can be created between the first endpoint and the second endpoint.

19 Claims, 6 Drawing Sheets

Related U.S. Application Data

(60) Provisional application No. 62/121,430, filed on Feb. 26, 2015.

(51) Int. Cl.
    *H04W 60/04* (2009.01)
    *H04W 84/04* (2009.01)

(52) U.S. Cl.
    CPC ...... *H04L 65/1016* (2013.01); *H04L 65/1036* (2013.01); *H04L 65/1073* (2013.01); *H04L 69/22* (2013.01); *H04W 60/04* (2013.01); *H04W 84/042* (2013.01)

(56) References Cited

U.S. PATENT DOCUMENTS

| | | | |
|---|---|---|---|
| 8,499,340 B2 * | 7/2013 | Lindholm | H04L 29/12584 370/401 |
| 8,611,890 B2 | 12/2013 | Ionescu | |
| 8,762,559 B2 | 6/2014 | Engelhart et al. | |
| 8,792,480 B2 | 7/2014 | Lu et al. | |
| 9,749,904 B1 * | 8/2017 | Zhang | H04W 36/0022 |
| 9,769,646 B2 * | 9/2017 | Mufti | H04L 65/1016 |
| 2003/0225900 A1 * | 12/2003 | Morishige | H04L 29/12358 709/230 |
| 2006/0067338 A1 | 3/2006 | Hua et al. | |
| 2006/0256748 A1 * | 11/2006 | Jung | H04L 65/104 370/328 |
| 2009/0024870 A1 | 1/2009 | Pressley et al. | |
| 2009/0055899 A1 * | 2/2009 | Deshpande | H04L 65/1069 726/4 |
| 2009/0093237 A1 * | 4/2009 | Levenshteyn | H04L 65/104 455/412.1 |
| 2009/0093249 A1 | 4/2009 | Zhu et al. | |
| 2009/0111430 A1 | 4/2009 | Li et al. | |
| 2009/0168758 A1 | 7/2009 | Apelqvist et al. | |
| 2009/0193469 A1 * | 7/2009 | Igarashi | H04N 7/17309 725/56 |
| 2010/0062767 A1 | 3/2010 | Leis et al. | |
| 2010/0191829 A1 * | 7/2010 | Cagenius | H04L 12/2834 709/219 |
| 2010/0220703 A1 | 9/2010 | Farrugia et al. | |
| 2011/0125925 A1 * | 5/2011 | Bouthemy | H04L 12/2834 709/250 |
| 2012/0214480 A1 | 8/2012 | Ionescu | |
| 2013/0171974 A1 * | 7/2013 | Bae | H04W 8/12 455/411 |
| 2014/0092853 A1 | 4/2014 | Noldus et al. | |
| 2014/0325078 A1 | 10/2014 | Shan et al. | |
| 2015/0172349 A1 * | 6/2015 | Gonzalez De Langarica | H04L 65/1016 709/219 |

OTHER PUBLICATIONS

European Patent Office, Extended European Search Report, EP Patent Application 16756400.4, dated Sep. 12, 2018, 9 pages.

* cited by examiner

REALM TRANSLATION IN AN IMS NETWORK

CROSS-REFERENCE TO RELATED APPLICATIONS

This application is a continuation of U.S. patent application Ser. No. 14/697,935 filed Apr. 28, 2015, now U.S. Pat. No. 9,769,646, which claims priority to U.S. Provisional Application Ser. No. 62/121,430 filed Feb. 26, 2015, both of which are incorporated herein by reference in their entireties for all purposes.

BACKGROUND

The Internet Protocol Multimedia Subsystem ("IMS") is an architectural framework for delivering Internet Protocol ("IP") multimedia to mobile users, such as users of smart phones or tablet computers. An IMS core network ("IMS network") permits wireless and wireline devices to access multimedia, messaging, and voice applications and services. IMS standards and specifications have been promulgated by the 3rd Generation Partnership Project ("3GPP"™). To allow the IMS network to be integrated with Internet resources, the 3GPP specifications use Internet Engineering Task Force protocols within the IMS network, such as Session Initiation Protocol ("SIP") and Diameter. SIP is a signaling protocol used for creating, modifying and terminating two-party or multiparty sessions consisting of one or several media streams. A mobile device registers its IP address with a SIP registrar server within an IMS network by generating and sending a SIP request message with a "REGISTER" method token. Once registered, a mobile device may subsequently establish multimedia sessions via the IMS network.

An IMS client (or IMS stack) software component on a mobile device allows one or more applications on the mobile device to register for various application services that are available on the IMS network, such as Voice over LTE (VoLTE), Rich Communication Services (RCS), Short Message Service over Internet Protocol (SMS over IP), and Presence. If the registration is successful, the mobile device application may then take advantage of the functionality offered by the application service to which it is registered. If the registration is unsuccessful, however, then the application will be unable to take advantage of the offered functionality.

BRIEF DESCRIPTION OF THE DRAWINGS

Embodiments of the present technology will be described and explained through the use of the accompanying drawings in which.

Figure 1:
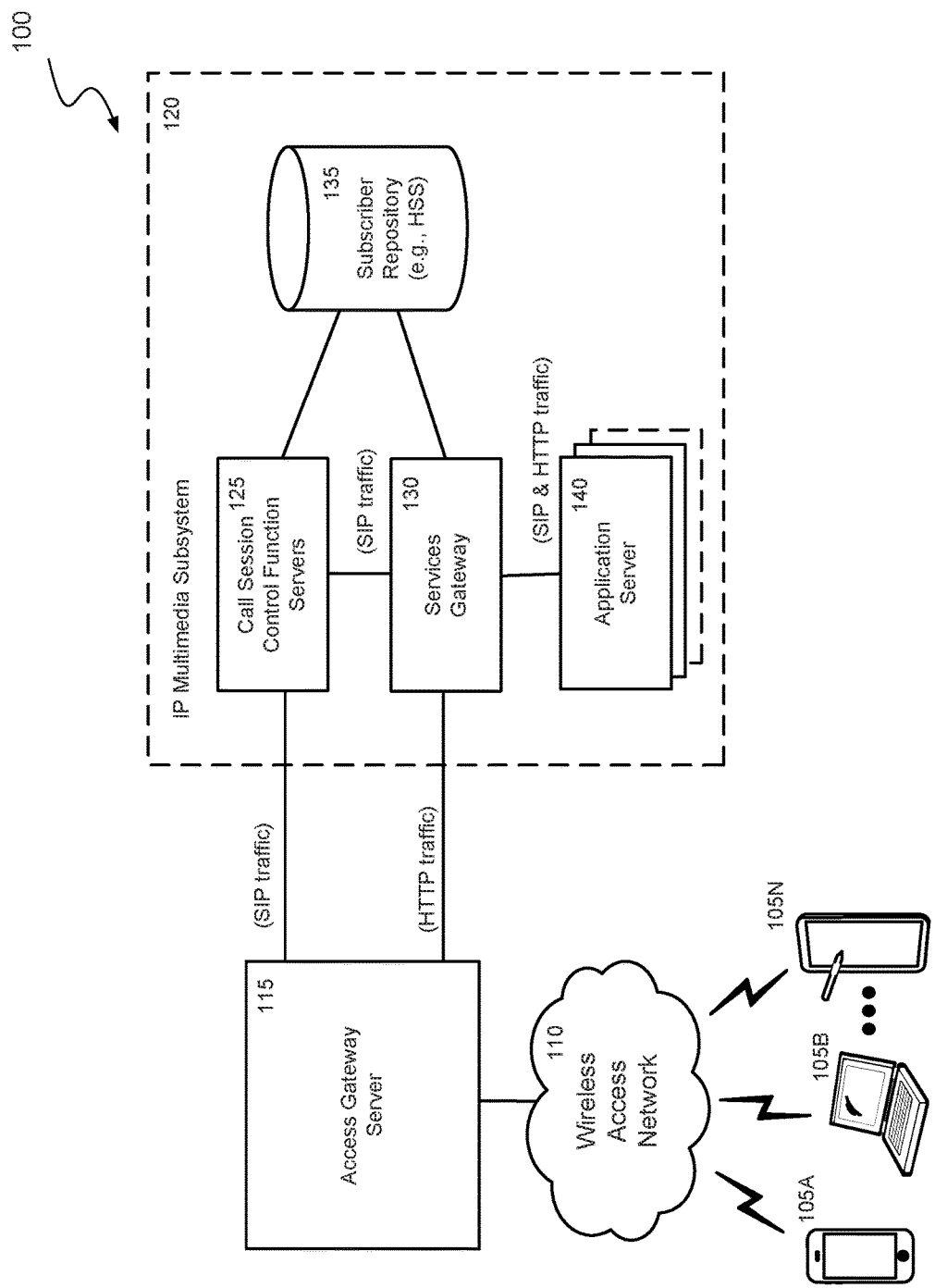
FIG. 1 is a diagram of a representative Internet Protocol Multimedia Subsystem (IMS) environment.

The drawings have not been drawn to scale. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments of the present technology generally relate to an Internet protocol multimedia network subsystem (IMS). An IMS is a standardized set of architecture specifications allowing service providers to deliver multimedia services independent of the type of network (e.g., packet-switched network, circuit-switched cellular, fixed-line network, etc.) on which they are being run. One important component of IMS based service delivery is the availability of clients on end-user devices (both hardware clients like handsets, and software clients like smartphone apps). These IMS clients can be tailored to suit the specific needs of service providers and may require custom development to make them interoperate with the IMS core network. Moreover, since the IMS domain relies on a trusted relationship between the network and the end-user, the IMS services are marketed and offered to the operator's own subscribers (i.e., trusted and known) thereby limiting the number of users that can potentially utilize and be eligible for these services.

In contrast, some embodiments of the present technology relate to an IMS network that provides multiple realm support. To this end, various embodiments of the present technology allow multi-realm support at an interrogating control session control function (I-CSCF) server/serving control session control function (S-CSCF) server to the IMS network by the same I/S-CSCF nodes. For example, some embodiments can allow an IMS subscriber to use both voice calling over LTE and over Wi-Fi (VoLTE and VoWiFi), which each use different realm values, by implementing logic on the I/S-CSCF to retain the user equipment (UE) provided realm, and to update all subsequent responses with that value. This provides operators the flexibility to maintain multiple realms per service, while simultaneously maintaining one global realm towards the home subscriber service (HSS). Thus, the operator could also define different realms for various business reasons, such as different realms associated with different brands (e.g., a premium brand of service, a budget brand of service, corporate service brands, etc.).

In the following description, for the purposes of explanation, numerous specific details are set forth in order to provide a thorough understanding of embodiments of the present invention. It will be apparent, however, to one skilled in the art that embodiments of the present invention may be practiced without some of these specific details. Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present invention, and may be included in more than one implementation. In addition, such phrases do not necessarily refer to the same embodiments or different embodiments.

FIG. 1 illustrates an example of a communications environment 100 in which some embodiments of the present invention may be utilized. As illustrated in FIG. 1, communications environment 100 may include one or more clients 105 (such as a mobile phone, tablet computer, mobile media device, mobile gaming device, vehicle-based computer, wearable computer, etc.), wireless access network 110, access gateway server 115, and IMS network 120. IMS network 120 may include a variety of components such as call session control function servers 125, services gateway 130, subscriber repository 135 (e.g., a Home Subscriber Server), and application servers 140.

It will be appreciated that communications environment 100 may include one or more networks that correspond to a number of IP-based and other networks such as the Internet, DSL networks, public switched telephone networks (PSTN) and other wire-line networks (e.g., SS7-based networks), wireless networks such as those using CDMA, GSM, 3G, 4G, IEEE 802.11x, and/or satellite phone communications or the like, and local area networks. For example, wireless access network 110 may be interfaced with other networks through access gateway server 115. Access gateway server 115 may be a Gateway GPRS Support Node (GGSN) for General Packet Radio Service (GPRS), a Packet Data Gateway (PDG) for Wi-Fi, Systems Architecture Evolution Gateway (SAE-GW) or a Packet Data Network Gateway (PDN-GW) for 3GPP Long Term Evolution (LTE), and the like.

IMS network 120 allows service providers to implement various mobile services for mobile devices. IMS registration for different IMS services may be based, for example, on SIP Event Package for Registration Information defined in Request for Comments (RFC) 3680 and procedures defined in 3GPP Test Specification (TS) 24.229. Users may employ mobile devices 105A-105N to communicate with other users and devices. In addition, users may employ mobile devices 105A-105N to receive, provide, or otherwise interact with multiple IMS services. For example, location-based services are services that use the actual or approximate location of a mobile device to provide, enhance, or supplement a service to the mobile device. Location-based services include, but are not limited to, services such as emergency services (e.g., E911), asset tracking or recovery services (e.g., the tracking of a stolen car), location-based alerts or advertising services (e.g., targeted advertisements that depend on the location of a mobile device user), social networking services (e.g., services that report the relative location of friends or family), and/or the like.

In addition, users may employ mobile devices 105A-105N to receive, provide, or otherwise interact with additional IMS services, including image sharing services, gaming services, multimedia telephony services, instant messaging and presence services, video conferencing and sharing services, Voice over LTE, Push-to-talk over Cellular (PoC) services, 3GPP combinational services (CSI), and other telecommunications and Internet converged services. Once a mobile device 105A-105N has successfully registered with the IMS network 120, the device may establish multimedia sessions managed by IMS network 120 in order to access applications and services that facilitate communication, location-based services and/or other services.

To ease the integration of IMS network 120 with Internet resources, various specifications (e.g., 3GPP specifications) use Internet Engineering Task Force protocols within IMS network 120. An example of one such protocol is session initiation protocol (SIP). SIP is a signaling protocol used for creating, modifying and terminating two-party or multiparty sessions consisting of one or several media streams. Endpoints must register with IMS network 120 in order to use IMS services. Traditionally, a mobile device, or other endpoint, registers its IP address with a SIP registrar server within IMS network 120 by generating and sending a SIP request message with a "REGISTER" method token. The IMS network 120 handles the authentication. CSCF 125 manages the signaling from devices 105 to services hosted by application server 140. CSCF can include multiple servers and proxies including proxy-CSCF (P-CSCF), interrogating-CSCF (I-CSCF) and serving-CSCF (S-CSCF).

A subscriber attempting to register with the network discovers which P-CSCF server it shall use for registration. Besides having the host name of the P-CSCF server internally configured, clients 105 may also request the P-CSCF server host name from the access network or obtain it through Dynamic Host Configuration Protocol (DHCP). The client sends a register message to the P-CSCF server. The client uses a Domain Name System (DNS) query to resolve the P-CSCF server host name into an IP address and Transport protocol (e.g., User Datagram Protocol (UDP)). The register message contains subscriber registration data, ("registration data"). This registration data includes the subscriber's public identifier, the home realm and the subscriber's contact address.

During registration, the P-CSCF server selects an inbound proxy, based on the home realm, and then forwards the register message to the selected inbound proxy, such as an I-CSCF server. The I-CSCF server can then determine if the home realm matches the realm of the user device. If so, the setup can proceed as normal. If not, the I-CSCF masks or translates the realm associated with the user device so that the HSS will accept the registration. The I-CSCF server then queries subscriber repository 135, based on the subscriber's public identifier, and asks for information regarding the S-CSCF server that shall be allocated for this subscriber. If no S-CSCF server is allocated to the subscriber at this moment, then I-CSCF server allocates one, based on information from the S-CSCF capabilities, received from subscriber repository 135. "S-CSCF capabilities" is a subscription parameter that indicates the capabilities that the S-CSCF to be selected for this subscriber should support. The I-CSCF server then forwards the Register message to the selected S-CSCF server.

The selected S-CSCF server informs subscriber repository 135 that this subscriber has registered and that this S-CSCF (the selected S-CSCF) has been assigned to that subscriber. Subscriber repository 135 stores the S-CSCF address for this subscriber, so subsequent registration or session establishment may be directed to this S-CSCF server. Subscriber repository 135 supplies the subscription profile to the S-CSCF server, which the S-CSCF server stores. The S-CSCF server also stores the contact address of the client, realm associated with the client, home realm, and the host name of the P-CSCF server. This enables the S-CSCF server to contact this terminal for session establishment, translate the realms before sending the message through the allocated P-CSCF server for the subscriber.

Subscriber repository 135, coupled to CSCF 125 and/or services gateway 130, may be a master user database containing the subscription-related information (subscriber profiles) that supports IMS network 120. Subscriber repository 135 may also perform authentication and authorization of the user, and can provide information about the subscriber's location and IP information. The subscriber repository 135 may be a home subscriber server (HSS) that can create a temporary binding between the provided user identity and the registration state as just described.

Figure 2:
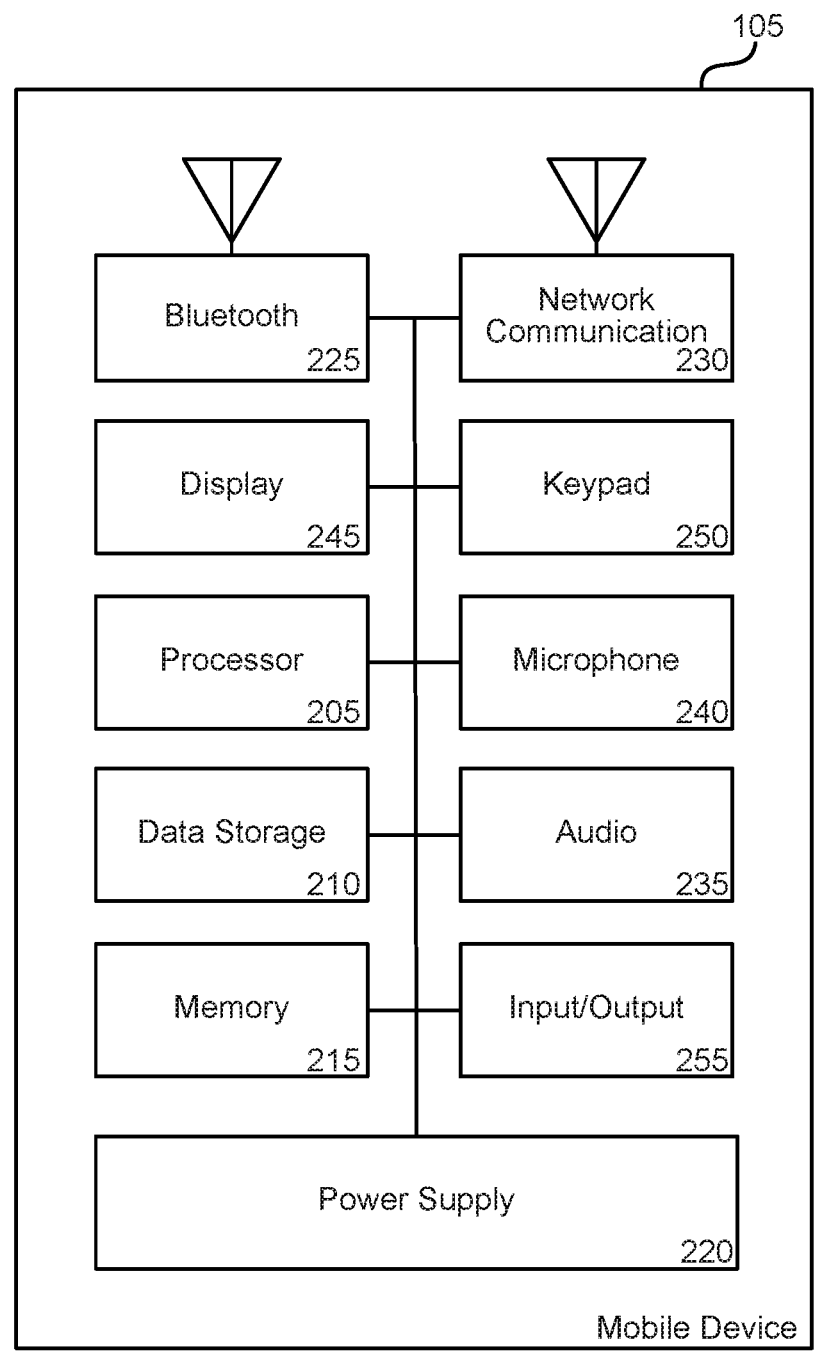
FIG. 2 is a block diagram of a representative mobile device that may request IMS services.

As shown in FIG. 2, which is a block diagram of a representative mobile device, each mobile device 105 typically includes a processor 205 for executing processing instructions, a data storage medium component 210 (e.g., hard drive, flash memory, memory card, etc.), volatile memory and/or nonvolatile memory 215, a power supply 220, one or more network interfaces (e.g., Bluetooth Interface 225; and Network Communication Interface 230, which enables the mobile phone to communicate by transmitting and receiving wireless signals using licensed, semi-licensed or unlicensed spectrum over a telecommunications network; GPS and WiFi interfaces, among others, may also be provided (not shown)), an audio interface 235, a microphone 240, a display 245, a keypad or keyboard 250, and other input and/or output interfaces 255. The various components of a mobile device may be interconnected via a bus.

The volatile and nonvolatile memories generally include storage media for storing information such as processor-readable instructions, data structures, program modules, or other data. Some examples of information that may be stored include basic input/output systems (BIOS), operating systems, and applications. The stored information may include one or more SIP clients capable of generating, transmitting and interpreting syntactically correct SIP messages. As described above, SIP clients permit the mobile device to register with and communicate via the IMS network 120.

Figure 3:
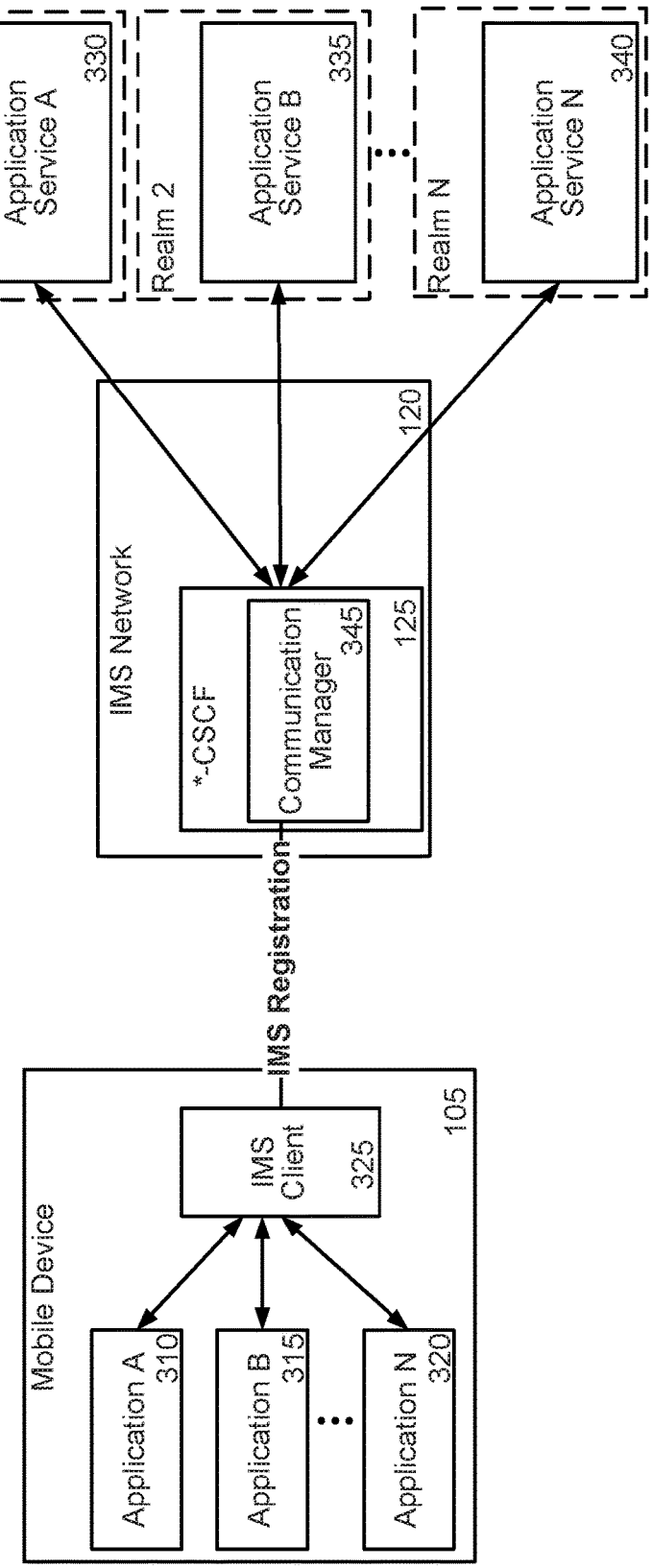
FIG. 3 is a block diagram providing a simplified view of the registration and delivery of IMS application services to mobile devices which are assigned to different realms.

FIG. 3 is a block diagram providing a simplified view of the registration and delivery of IMS application services to mobile devices. Applications running in the mobile device 105 use an IMS client 325 to register for application services in the IMS network 120. The IMS client (or IMS stack) maintains an IMS registration as long as an application needs to stay connected with a corresponding application service. The IMS proxies (*-CSCFs) 125 in IMS network 120 maintain the registration initiated by the mobile device and provide the appropriate routing for IMS traffic. When for any reason one of the application servers involved rejects the initial registration request, the IMS service is not available to the mobile device and the application functionality on the mobile device may be substantially or completely impacted by the registration failure.

FIG. 3 illustrates multiple applications 310, 315, and 320 on mobile device 105. The applications on mobile device 105 may be associated with different home service providers (e.g., different realms) and communicate with the IMS network 120 through IMS client 325. IMS client 325 may reside within mobile device 105 and manage communications between mobile device applications and other components in IMS network 120. For example, IMS client 325 can receive registration requests from mobile device applications 310, 315, and 320, forward the received registration requests to IMS network 120, receive registration status notification subscription requests from the mobile device applications, and forward the received registration status notification subscription requests to the IMS network 120.

In some embodiments, IMS client 325 can additionally receive registration status notifications from application services 330, 335, and 340, which may belong to different home realms, and forward the received status notifications to the appropriate mobile device applications. Those skilled in the art will appreciate that the IMS client 325 may be implemented in an Android™, Windows™, iOS™, or other operating system environment that is used by mobile devices.

IMS client 325 can connect to communication manager component 345 within one or more of the CSCF 125 in IMS network 120. Communication manager 345 can reside within the IMS network 120; it manages registrations and communications between one or more mobile device applications 310, 315, and 320 and one or more application services 330, 335, and 340. For example, communication manager 345 can do the following:

1. receive registration requests from the mobile device applications,
2. translate or mask the realms when the UE realm is different than the HSS realm,
3. receive registration status notification subscription requests from the IMS client,
4. translate the HSS realm back to the UE realm, and
5. forward the received registration status notification subscription requests to the appropriate application servers.

In some embodiments, communication manager 345 may receive a single request that functions as both a registration request and a registration status notification subscription request.

Figure 4:
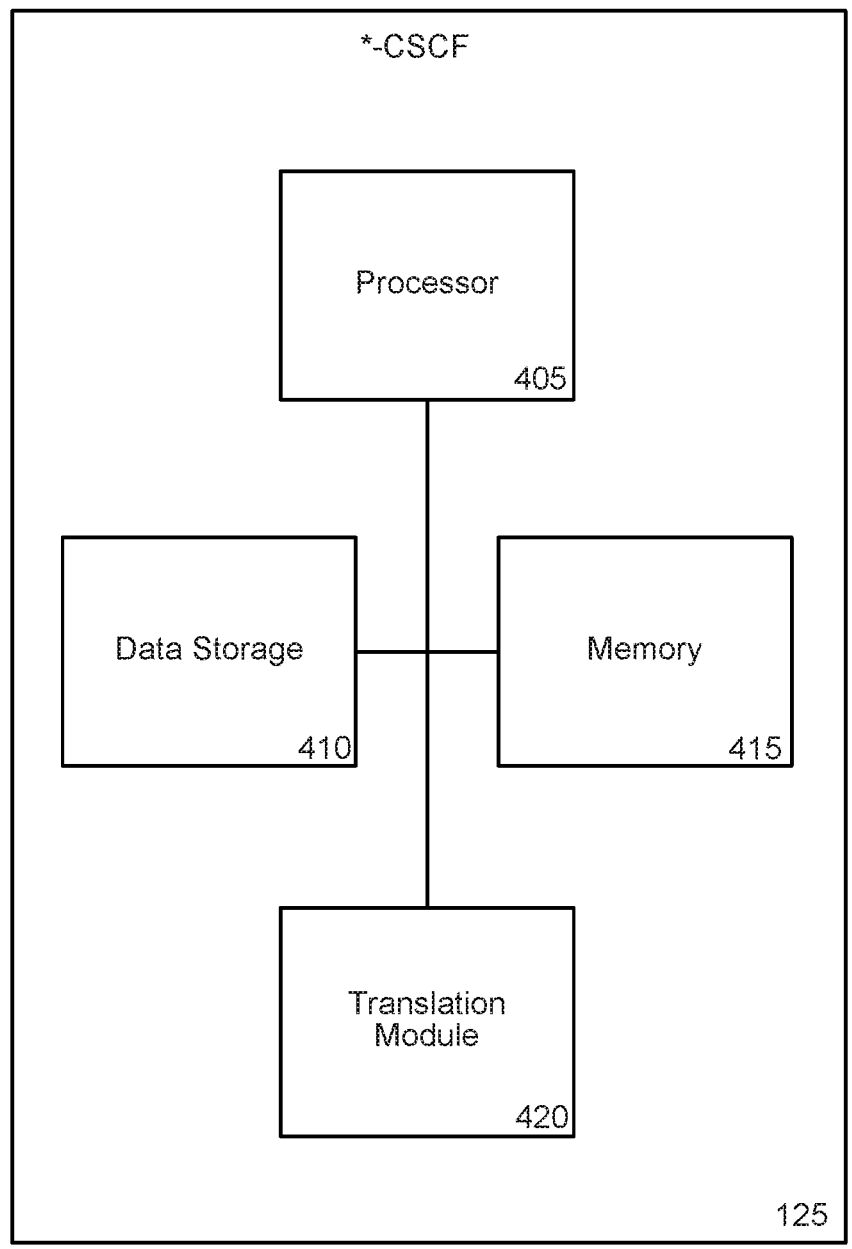
FIG. 4 is a block diagram of a CSCF node within an IMS network.

FIG. 4 is a block diagram of a CSCF node 125 within IMS network 120 (as illustrated in FIG. 3), which implements the functionality of the communication manager 345. CSCF 125 may contain one or more processors 405 for executing processing instructions, a data storage medium component 410 (e.g., hard drive, flash memory, memory card, etc.), a volatile memory and/or nonvolatile memory 415, and a translation module 420.

Although depicted separately, it will be appreciated that translation module 420 may be incorporated into data storage 410 or memory 415, or may be incorporated into a component that is external to CSCF 125. Instructions for implementing functions of the translation module 420 may be stored in the data storage medium and/or memory and executed by the processor. While the functionality of translation module 420 is depicted as residing within the CSCF 125, it will be appreciated that translation module 420 may be implemented independently from the CSCF 125. That is, translation module 420 may be operated as a stand-alone service within IMS network 120 or may be incorporated in other network nodes within IMS network 120.

Figure 5:
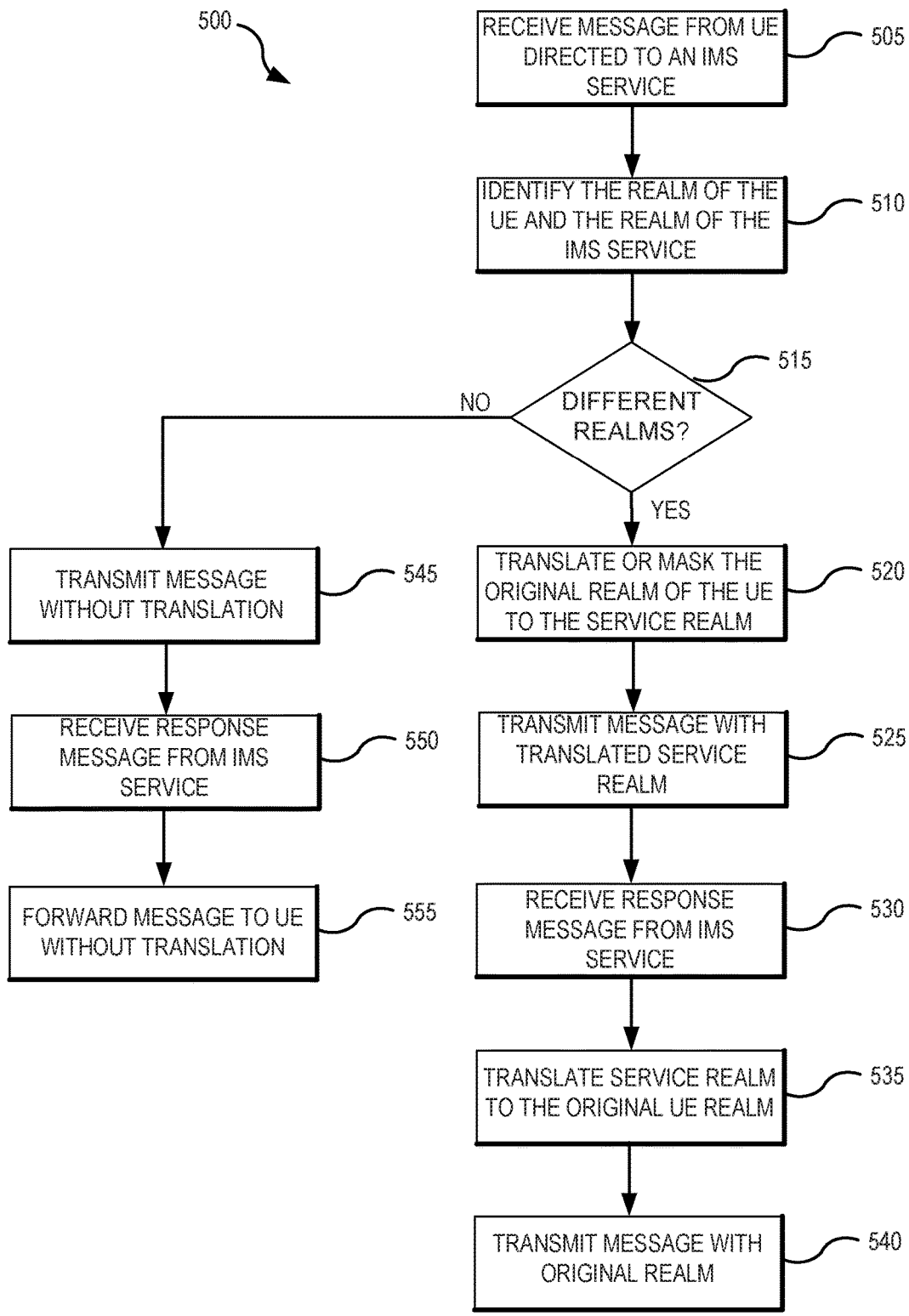
FIG. 5 is a flowchart illustrating a representative set of operations that may be used to manage communications between user equipment and services that are associated with different realms.

FIG. 5 is a flowchart illustrating a representative set of operations 500 that may be used to manage communications between user equipment (UE) and services that are associated with different realms. As illustrated in FIG. 5, a message is received from a UE directed to an IMS service during receiving operation 505. The IMS service may have a different realm (or domain) than the UE. Identification operation 510 identifies the realm of the UE and the realm of the IMS service. Differentiation operation 515 determines whether the realms are different.

If differentiation operation 515 determines that the realms of the UE and the IMS service are different, then differentiation operation 515 branches to translation operation 520 where the original realm of the UE is translated to the service realm. This can be done, for example, by updating a realm header field parameter within a SIP message with the service realm. The message is then transmitted with the updated service realm during transmission operation 525. A response from the IMS service is received during receiving operation 530 and the service realm in the message is translated back to the original UE realm during translation operation 535. The message with the original UE realm is then transmitted back to the UE during transmission operation 540.

If differentiation operation 515 determines that the realms of the UE and the IMS service are not different, then differentiation operation 515 branches to transmission operation 545 where the message is transmitted to the IMS service without translation. A response message is received form the IMS service during receiving operation 550. Since no translation is needed, because the realms match, the message is forwarded to the UE without translation during forwarding operation 555.

Figure 6:
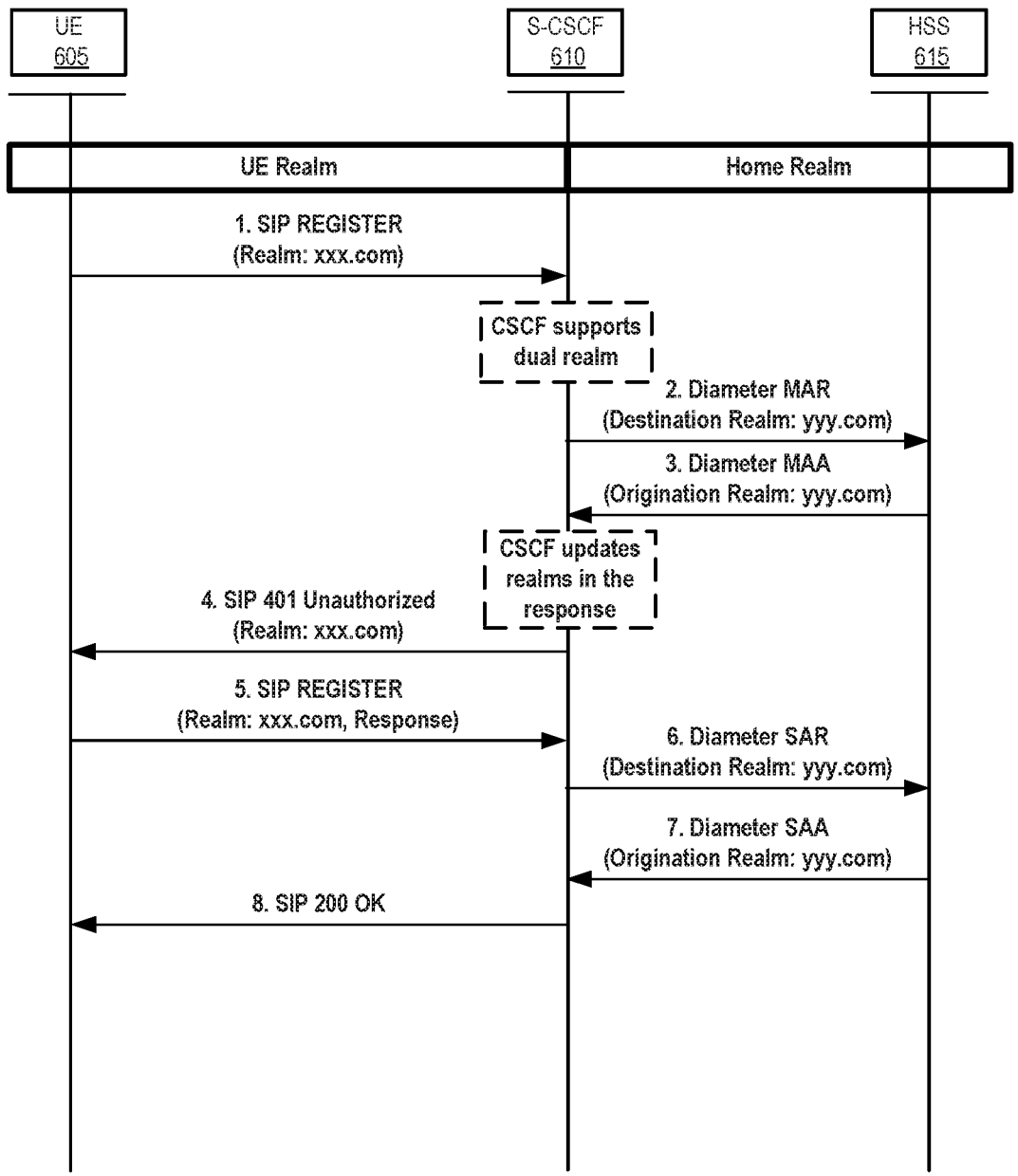
FIG. 6 is a sequence diagram illustrating an example of a set of communications between components of a communication network.

FIG. 6 is a sequence diagram illustrating an example of a set of communications between components of a communication network. As illustrated in FIG. 6, UE 605 generates a SIP REGISTER message that identifies the UE as being associated with a first realm (e.g., xxx.com). In a first communication, the UE transmits SIP register message to S-CSCF 610, which is associated with a home realm of HSS 615 (e.g., yyy.com). CSCF 610 supports dual realm and generates a Diameter Multimedia-Auth-Request (MAR), which in a second communication, is transmitted to the destination home realm. Upon processing the request, HSS 615 generates a Diameter Multimedia-Auth-Answer (MAA). If the realms were different the Diameter MAA would be a message indicating that the realm was not served. However, since CSCF 610 translated or masked the original UE realm so that the HSS determined UE 605 was associated with the desired home realm, such a message is not generated. Instead the HSS generates an unauthorized message (e.g., SIP 401), which in a third communication it transmits back to the S-CSCF 610.

Upon receiving the response from the HSS, CSCF 610 updates the realms in the response (instead of rejecting the register request) and forwards the message to the UE in a fourth communication. CSCF 610 can then respond with a request for a server assignment for the service. The UE, in a fifth communication, sends a SIP REGISTER request to the S-CSCF 610. The CSCF 610 again translates the SIP REGISTER request to generate a Diameter Server-Assignment-Request (SAR) to the destination home realm, in a sixth communication. Upon processing the request, HSS 615 generates a Diameter Server-Assignment-Answer (SAA) identifying a server. The HSS 615, in a seventh communication, sends the Diameter SAS to the S-CSCF 610. The S-CSCF 610 again converts the message back to the UE realm before transmitting it to UE 605 (eighth communication) and thereby creating a binding between UE 605 and an application service.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. At least one non-transitory computer-readable medium, carrying instructions, which when executed by at least one data processor, performs a method for use in a telecommunications network for routing communications, the method comprising:
   receiving a request from an initiating device to establish a service connection session between the initiating device and an endpoint through an Internet Protocol Multimedia Subsystem (IMS) session,
      wherein the initiating device is assigned to a first realm, and
      wherein the endpoint is associated with a second, different realm; and,
   providing a Session Initiation Protocol (SIP) REGISTER message based on the request to create the IMS session,
      wherein the SIP REGISTER message identifies the initiating device as being assigned to the second realm;
      wherein the IMS session is created between the initiating device and the endpoint,
      wherein, during the session, the first realm is translated into the second realm upon receiving messages from the initiating device; and
      wherein, during the session, the second realm is translated into the first realm upon receiving messages from the endpoint.

2. The non-transitory computer-readable medium of claim 1, wherein the endpoint is an IMS service including white board discussions, video conferencing, Push to talk over Cellular (PoC), Voice over IP (VoIP), real-time content sharing, instant messaging, interactive gaming Voice over LTE (VoLTE), short messaging service (SMS) over IP, Rich Communication Suite (RCS), or Presence.

3. The non-transitory computer-readable medium of claim 1, wherein the request is a SIP request and generating the registration message based on the request includes setting a realm header field parameter of the SIP request to identify the second realm.

4. The non-transitory computer-readable medium of claim 1, wherein the method further comprises:
   receiving a response message from the endpoint,
      wherein the response message from the endpoint identifies the second realm; and
   generating a translated response message that identifies the first realm instead of the second realm before forwarding the message onto the initiating device.

5. The non-transitory computer-readable medium of claim 1, wherein the method further comprises:
   receiving a response message from the endpoint,
      wherein the response message from the endpoint identifies the second realm; and
   generating a translated response message that identifies the first realm instead of the second realm before forwarding the message onto the initiating device.

6. The non-transitory computer-readable medium of claim 1, wherein the endpoint is one of multiple IMS services each assigned to a different realm, and wherein the method further comprises generating a bill for the initiating device based on the second realm.

7. The non-transitory computer-readable medium of claim 1, wherein the endpoint is one of multiple IMS services each assigned to a different realm.

8. A communications system offering Internet Protocol Multimedia Subsystem (IMS) services, the communications system comprising:
   a subscriber database that stores multiple subscriber profiles, wherein each subscriber profile of the multiple subscriber profiles is associated with a home realm;
   a memory; and
   a hardware processor coupled to the memory, wherein the communications system is configured to:
      mask the home realm of user equipment associated with a subscriber profile in messages between a selected IMS service and the user equipment,
      wherein the home realm is different than a destination realm associated with the IMS service,
      wherein the masking comprises translating an IMS registration message so that the destination realm interprets the user equipment as being associated with the destination realm,
      wherein the home realm is translated into the destination realm upon receiving messages from the user equipment, and
      wherein the destination realm is translated into the home realm upon receiving messages from the IMS service.

9. The communications system of claim 8, wherein the subscriber database is a home subscriber server and the communication manager is part of a serving control session control function (S-CSCF) node.

10. The communications system of claim 8, wherein the subscriber database is a home subscriber server.

11. The communications system of claim 8, wherein the subscriber database is a home subscriber server (HSS), the translation occurs at least partially in a serving control session control function (S-CSCF) node, and the S-CSCF node uses Diameter interfaces to download subscriber profiles from the HSS.

12. The communications system of claim 8, wherein the subscriber database is a home subscriber server, the translation occurs at least partially in a serving control session control function (S-CSCF) node, and the S-CSCF node translates a realm field parameter in the SIP REGISTER message from the originating realm to the destination realm.

13. The communications system of claim 8, wherein each of the IMS services is associated with a different realm that is associated with a different brand.

14. The communications system of claim 8, wherein the IMS services include white board discussions, video conferencing, Push to talk over Cellular (PoC), Voice over IP (VoIP), real-time content sharing, instant messaging, interactive gaming Voice over LTE (VoLTE), short messaging service (SMS) over IP, Rich Communication Suite (RCS), or Presence.

15. A method for use in a telecommunications network for routing communications, the method comprising:
   receiving a request from an initiating device to establish a service connection session between the initiating device and an endpoint through an Internet Protocol Multimedia Subsystem (IMS) session, wherein the initiating device is assigned to a first realm, and wherein the endpoint is associated with a second, different realm; and, providing a Session Initiation Protocol (SIP) REGISTER message based on the request to create the IMS session, wherein the SIP REGISTER message identifies the initiating device as being assigned to the second realm;

wherein the IMS session is created between the initiating device and the endpoint, wherein, during the session, the first realm is translated into the second realm upon receiving messages from the initiating device; and wherein, during the session, the second realm is translated into the first realm upon receiving messages from the endpoint.

16. The method of claim 15, wherein the endpoint is an IMS service including white board discussions, video conferencing, Push to talk over Cellular (PoC), Voice over IP (VoIP), real-time content sharing, instant messaging, interactive gaming Voice over LTE (VoLTE), short messaging service (SMS) over IP, Rich Communication Suite (RCS), or Presence.

17. The method of claim 15, wherein the request is a SIP request and generating the registration message based on the request includes setting a realm header field parameter of the SIP request to identify the second realm.

18. The method of claim 15, wherein the method further comprises:

receiving a response message from the endpoint, wherein the response message from the endpoint identifies the second realm; and generating a translated response message that identifies the first realm instead of the second realm before forwarding the message onto the initiating device.

19. The method of claim 15, wherein the endpoint is one of multiple IMS services each assigned to a different realm, and wherein the method further comprises generating a bill for the initiating device based on the second realm.

* * * * *